United States Patent Office 2,705,047
Patented Mar. 29, 1955

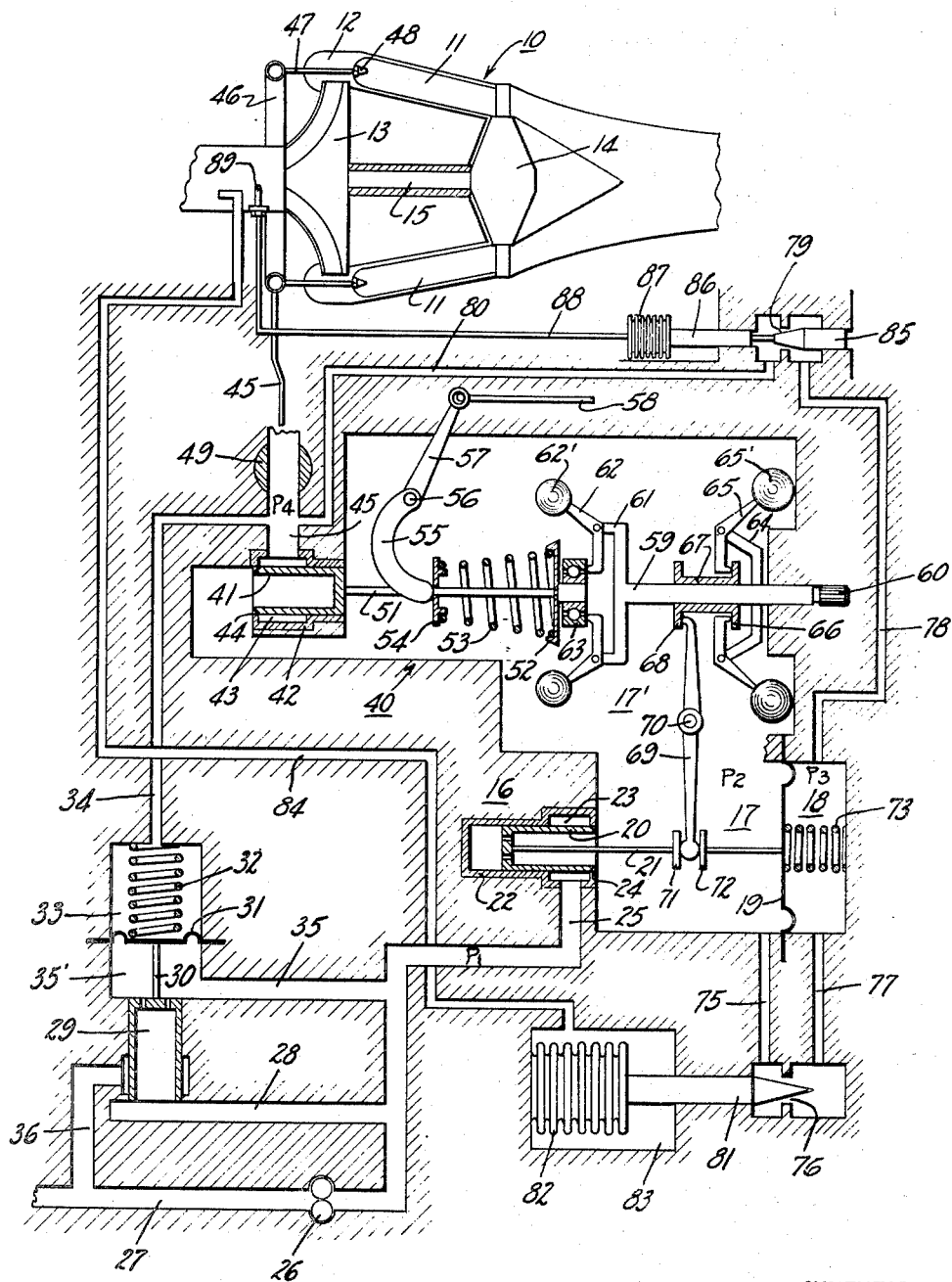

2,705,047

FUEL CONTROL SYSTEM FOR GAS TURBINE ENGINES

Howard J. Williams and Waldo J. Hall, South Bend, Ind., assignors to Bendix Aviation Corporation, South Bend, Ind., a corporation of Delaware Application August 18, 1949, Serial No. 111,126

3 Claims. (Cl. 158—36.3)

This invention relates to a fuel control system for gas turbine engines designed to operate under conditions of varying air intake density, as for example engines for use in aircraft. As is well known, fuel supply systems for such engines require means for automatically adjusting the rate of fuel feed as a function of the pressure and temperature, and therefore density, of the air flowing to the engine. Since control of power output in a gas turbine engine is usually had by varying the rate of the flow of fuel to the burners in contradistinction to varying the rate of both the flow of air and liquid fuel to the combustion chambers as in internal combustion engines, different problems are encountered in the fuel supply systems for the respective types of engines.

In application Serial No. 620,755, filed October 6, 1945 in the name of Frank C. Mock, now Patent No. 2,644,513, and in application Serial No. 418,058, filed March 23, 1954, which is a divisional application based on Serial No. 43,463, filed August 10, 1948 in the name of Howard J. Williams, and assigned to the assignee of the present application, there is disclosed control means for gas turbine engines wherein compensation for changes in density is had by automatically varying the fuel head across the throttle valve (which is controllable by a pilot or operator) through the medium of a bleed-off circuit which by-passes the throttle valve. The density compensating system in each above noted patent and application, while not so illustrated, is particularly adapted for fuel control systems of the type disclosed in the copending applications of Frank C. Mock, Serial Nos. 557,812, now Patent No. 2,581,275; 596,620, now Patent Nos. 2,581,276 and 716,154, now Patent No. 2,689,606; filed respectively November 9, 1944; May 30, 1945 and December 13, 1946 (common assignee). The above noted Mock control systems operate on the principle that since the mass flow of air to the burners in a gas turbine engine is a substantially linear function of engine speed, the rate of fuel feed may therefore be a function of or proportional to engine speed, subject to correction for changes in entering air density. The present invention is also particularly adapted for control systems of the type disclosed in the said Mock patents and for control systems of the type disclosed in the said Williams application, and constitutes a specific improvement of the density compensating circuit means disclosed in Williams.

The primary object of the present invention is to provide a fuel control for gas turbine engines embodying an improved type of density compensating circuit having superiorly accurate compensating characteristics.

Another object is to provide a fuel control device having a density compensating system wherein the controlling elements or units may be readily calibrated, tested and serviced.

The foregoing and other objects and advantages will become apparent in view of the following description taken in conjunction with the drawing, wherein the single figure is a schematic view of a fuel control system for a gas turbine engine embodying the features of the present invention.

Referring to the drawing in detail, a gas turbine engine is generally indicated at 10; it is provided with a series of combustion chambers 11 mounted in a casing having a header or air intake section 12 at the forward end thereof. A dynamic compressor is indicated at 13; it is shown as of the centrifugal type, but may be of the axial flow type, and is driven by means of a turbine 14 through a shaft 15. As will be understood, when fuel is supplied to the combustion chambers 11 and ignited, the expanded air and products of combustion are discharged through the turbine, part of the resultant energy being utilized in driving the turbine and compressor and the remainder being used either for jet thrust or for driving a propeller or for both, depending upon the particular type of engine involved.

The fuel control system comprises a regulator section, generally indicated at 16, which is divided into a pair of chambers 17 and 18 by a metering head diaphragm 19. A regulator valve 20 has its stem 21 connected to the diaphragm 19, said valve being slidingly mounted in a casing 22 defining annular chamber 23, from which fuel flows across said valve by way of annular port 24. Fuel is delivered to the chamber 23 by way of a conduit 25 having a pressuring device in the form of a pump 26 mounted therein which draws fuel from any suitable source such as a fuel tank, not shown, by way of conduit 27. The pump as here shown is of the positive displacement type and is provided with a by-pass conduit 28 controlled by a valve 29 having its stem 30 connected to a diaphragm 31, which is backed by a spring 32 located in a chamber 33 which is vented to metered fuel or discharge pressure by way of conduit 34. The side of the diaphragm opposite the chamber 33 is vented to pump discharge pressure by way of conduit 35 and chamber 35'. When the delivery pressure ($P_1$) exceeds that of the metered fuel ($P_4$ pressure) by a value determined by the force of spring 32, the valve 29 opens and fuel is returned to the low pressure side of the pump 26 by way of conduit 36.

A control section or body is generally indicated at 40; it contains a throttle valve 41 of the all-speed governor type which is slidably mounted in a casing 42 defining an annular chamber 43. The valve 41 controls an annular metering restriction 44 through which fuel flows from chamber 17' to the annular chamber 43 and thence by way of conduit 45 to a fuel manifold 46, provided with a series of individual fuel lines 47, which conduct fuel under pressure to discharge nozzles 48. The valve indicated at 49 is a cut-off valve for shutting off all flow of fuel to the burners when desired and found necessary.

The throttle valve 41 is provided with a stem 51 which has secured on the inner end thereof a spring backing plate 52. A governor spring 53 encircles the stem 51 and at one end abuts the plate 52 and at its opposite end bears against a movable plate 54, adapted to be contacted by throttle lever 55, mounted on a shaft 56, the latter being rotatable by means of lever 57, which is connected by link 58 to a pilot's control device, not shown.

An engine driven shaft 59 is provided at its outer end with a drive pinion 60 and at its inner end carries bracket arms 61 on which are pivotally mounted levers 62, having governor weights 62' on the outer ends thereof. At their inner ends, the levers 62 engage the outer member of a thtrust bearing 63, the inner member of which is fixed on the stem 51 of the valve 41.

The engine driven shaft 59 also carries bracket arms 64, which have pivotally mounted thereon levers 65, having speed metering or regulator weights 65' on the outer ends thereof. At their inner ends the levers 65 bear against the adjacent end flange 66 of a sleeve 67, slidable on the shaft 59, the said sleeve being provided with another flange 68 at its opposite end which engages the upper or adjacent end of a lever 69, pivoted or fulcrumed at 70 and at its opposite end engaging between members 71 and 72 secured on the regulator valve stem 21.

It will be seen that when the lever 55 is turned or rotated counterclockwise, the spring 53 is compressed and the governor valve 41 simultaneously moved in a direction to increase the area of the feed or metering restriction 44. This increases the rate of fuel feed and hence the engine speed. When the selected speed is reached, the governor weights balance the governor spring and an equilibrium condition is attained, whereupon the engine will operate at a substantially constant speed for the particular setting of the pilot's control lever. By means of the speed metering weights 65', which are operatively connected to the regulator valve 20 and metering head diaphragm 19, the latter valve is positioned automatically as a function of engine speed. Thus, when shaft 59 is rotated, the speed metering weight 65' will exert a force in a direction tending to open the regulator valve 20. As valve 20 opens, flow of fuel is increased, and this exerts a force on the diaphragm 19 in opposition to that exerted by the weights 65'. The resultant differential across diaphragm 19 is proportional to the square of engine speed and the differential pressure applied across the said throttle valve 41 is proportional thereto. Since flow through the metering restriction 44 is directly proportional to the square root of this differential, such flow at any fixed position of valve 41 will be proportional to engine speed directly. The spring indicated at 73 is to maintain a minimum fuel metering head at low throttle settings; it has substantially no effect on the differential across the diaphragm 19 at fuel flows above some predetermined low value and below which the control tends to become unstable.

The density compensating circuit, with which the present invention is primarily concerned, consists of a bleed-off of the main circuit starting with a passage 75 and continuing by way of an upstream orifice 76 and passage 77 to chamber 18, and thence by way of passage 78, a downstream orifice 79 and passage 80 to metered fuel conduit 45. The orifice 76 is controlled by a contoured needle 81 connected to an evacuated pressure responsive bellows 82, mounted in a chamber 83, which is vented to intake or ram pressure by passage 84.

The orifice 79, in series with the orifice 76, is controlled by a contoured needle 85 connected by means of rod 86 with a temperature responsive element in the form of a bellows 87, connected by means of tube 88 with a temperature bulb 89, located at a point where it will be subjected to changes in temperature of the air flowing to the compressor. The bulb 89, tube 88 and bellows 87 contain a suitable temperature responsive medium in accordance with known practice.

*Operation*

To simplify the description, fuel at pump discharge pressure is designated $P_1$, unmetered fuel pressure $P_2$, compensating pressure $P_3$, and metered fuel pressure $P_4$. In tracing the flow of fuel through the metering system, fuel from a suitable source of supply comes in by way of conduit 27 to the low pressure side of pump 26, which pressurizes it in conduit 25 and annular chamber 23 to some predetermined value over and above metered fuel or $P_4$ pressure, as determined by spring 32, which maintains a constant drop across the control, said drop being used by the regulator and governor valves to meter the fuel for delivery to the engine. As above noted, the regulator valve 20 is positioned as a function of engine speed, so that the flow across the metering restriction 44 at any given position of the throttle valve 41 will be proportional to such speed. Metered fuel flows by way of passage 45 to the fuel manifold 46, from whence it is fed to the individual discharge nozzles 48 through the fuel lines 47. A limited quantity of fuel will be bled off the main circuit and by-pass the throttle valve to conduit 45 by way of density compensating circuit 75, 76, 77, 18, 78, 80, which is in parallel with the main metering circuit.

Should the pilot desire to accelerate the engine, he moves the governor valve in a direction to increase the area of the metering restriction 44. This results in a decrease in the drop or differential across the latter and consequently decreases the differential across the metering head diaphragm 19, the regulator valve 20 moves towards open position, feed of fuel to the burners is increased, and the engine speeds up until the governor weights 62' balance the setting of the governor spring 53, whereupon an equilibrium condition is attained. Movement of the governor valve 41 in a direction to restrict the flow of fuel increases the differential across the said valve and also across the diaphragm 19, the regulator valve 20 moves towards closed position, feed of fuel to the burners is decreased, and the turbine or engine speed is reduced until a condition of equilibrium is again attained. During acceleration and deceleration, the metering head or differential and hence the rate of fuel feed will increase and decrease as a function of engine speed, as will also the quantity of air delivered to the burners.

Upon a decrease in the density of the air flowing to the engine, less fuel is required to drive the turbine and compressor at a given speed, and unless the maximum rate of fuel delivered to the engine on acceleration is correspondingly reduced, much higher burner temperatures will be experienced during acceleration at altitude that would be the case at sea level under similar engine conditions, due to the extremely rich fuel-air ratio. It can be assumed for an engine of the type herein described, that the rate of fuel feed required to maintain a given speed varies approximately directly with the entering air density. If a pilot or operator were to carefully "nurse" the power control lever during acceleration and adjust the governor valve 41 in a manner such that the rate of fuel feed increased in direct relation to engine speed, compensation for changes in density by regulating the differential across the governor valve would not be necessary, but the control would then be so sensitive as to be impractical; and this also holds true during deceleration. Again, in gas turbine engines for aircraft, it may be desirable to have a relatively high idling speed to insure against engine failure when in the air, and this correspondingly reduces the range of governor valve movement and increases sensitvity between low and high power settings.

The density control circuit operates in the following manner:

The bellows 82, being evacuated, responds to changes in pressure only, whereas the bellows 87 responds to changes in temperature only. The chamber 17 ($P_2$ pressure) is connected with the conduit 45 ($P_4$ pressure) by two passages in parallel, one, the main circuit comprising the passage 17' and metering restriction 44, and the other the density circuit including passage 75, variable orifice 76, passage 77, chamber 18, passage 78, variable orifice 79 and passage 80. The density circuit senses the pressure differential across the governor or throttle valve in order to correct the position of the regulator valve for variations in compressor air inlet pressure and temperature. The fuel pressure differential across the regulator diaphragm 19, which in the type of control illustrated varies as a function of engine speed, is applied across the pressure orifice 76. When the engine speed is constant and the entering air pressure and temperature are constant, the control is in balance. If the engine is operating at sea level, and assuming normal temperature, then the needle 81 will be in a retracted position while needle 85 will be at some intermediate position, the latter depending upon the range of temperatures to be encountered. As altitude is gained, needle 81 will increasingly restrict the area of orifice 76. This will increase the drop across the latter orifice and momentarily increase the $P_2$—$P_3$ differential, whereupon the regulator valve will move toward closed position to re-establish the differential across the metering head diaphragm 19 for the then existing throttle setting, the net result being a reduction in the metering head ($P_2$—$P_4$) to compensate for changes in the pressure component of air density. Should there be a decrease in temperature with a gain in altitude (a condition normally encountered) needle 85 will move in a direction to restrict orifice 79. This will increase the drop across orifice 79 and correspondingly increase the $P_3$—$P_4$ differential to compensate for changes in the temperature component. If there should be an increase in pressure (decreasing altitude) needle 81 will move in a direction to increase the area of orifice 76. This will reduce the drop across the latter orifice and momentarily reduce the $P_2$—$P_3$ differential, causing the regulator valve to move toward open position to re-establish the differential across the metering head diaphragm for a given throttle setting and increase the metering head across the throttle valve $P_2$—$P_4$ differential. If the temperature rises as the pressure increases, then needle 85 will move in a direction to reduce the drop across orifice 79 and correspondingly decrease the $P_3$—$P_4$ differential to compensate for the change in the temperature component. Obviously, compensation will ensue in a like manner irrespective of whether or not the change in density results from a simultaneous change in the pressure and temperature components, or a change in either of said components.

It is important to understand that our invention provides density compensating means which inherently compensates burner fuel flow for variations in ambient pressure and/or temperature to a superiorly accurate degree than heretofore. For example, a reversal of the valves 81 and 85 in conduit 77, 78 would result in somewhat less accurate pressure and temperature compensation with increasing altitude inasmuch as the valve which controls upstream orifice 76 also controls the quantity of flow through the density compensating circuit. If said orifice 76 were controlled by a temperature responsive element instead of by a pressure responsive element, as hereinafter claimed, it is apparent that a decrease in temperature resulting from an increase in altitude will increase the area of orifice 76 which results in an increase in bleed circuit flow, which is in the wrong direction for an increase in altitude. With the arrangement herein disclosed, however, the bleed circuit flow through conduit 77, 78 is controlled by pressure responsive valve 81 and therefore always varies in the opposite direction or sense as the altitude, which characteristic is most desirable. In other words, flow through the bleed circuit varies with the fuel requirements of the engine, bleed flow being at a maximum at sea level operating conditions and decreasing as altitude increases and as the rate of main fuel feed decreases.

The system herein disclosed permits individual calibration of the pressure and temperature units and consequently less complicated and more accurate calibration; and this feature also facilitates testing and servicing.

Although only one embodiment of the invention has been illustrated and described, certain changes in the form and relative arrangement of the parts may be made to suit requirements.

We claim:

1. In a fuel control device for an engine having an air compressor, a fuel conduit for supplying fuel under pressure to the engine having a feed restriction therein, and fuel flow control means for controlling the fuel pressure head across said restriction including valve means in said conduit and means operatively connected to said valve means for modifying the action thereof as a function of changes in compressor inlet pressure and temperature, said last mentioned means including a pressure responsive motor means for actuating said valve means, a fluid passage means operatively connected to said motor means and leading to the fuel conduit downstream of said feed restriction, first and second orifices in series in said passage means, said first orifice being upstream of said second orifice, compressor inlet pressure responsive valvular means for controlling said first orifice to cause the pressure in said passage means to act on said motor means to bias said valve means upon an increase in compressor inlet pressure in a direction to increase the pressure head across said feed restriction, and compressor inlet temperature responsive valvular means for controlling said second orifice to cause the pressure in said passage means to act on said motor means to bias said valve means upon an increase in compressor inlet temperature in a direction to decrease the pressure head across said feed restriction.

2. In a fuel system for an engine having an air compressor, a fuel conduit, a first valve in said conduit, a metering orifice downstream in said conduit, a source of fluid pressure delivering to said conduit, means to maintain the pressure drop across said valve and said metering orifice constant, pressure responsive motor means for actuating said valve, pressure fluid conduit means connected to said motor means and leading to the fuel conduit downstream of the metering orifice, said pressure fluid conduit means having first and second orifices in series therein, said first orifice being upstream of said second orifice, a second valve responsive to compressor inlet air pressure and controlling said first orifice to cause the pressure in said pressure fluid conduit to act on said motor means to bias said first valve upon increase of said air pressure in an opening direction, and a third valve responsive to compressor inlet air temperature and controlling said second orifice to cause the pressure in said pressure fluid conduit to act on said motor means to bias said first valve upon an increase in said air temperature in a closing direction.

3. In a fuel system for an engine, a fuel conduit, a first valve in said conduit, a metering orifice in said conduit downstream of said valve, a source of fluid pressure delivering to said conduit, pressure responsive motor means for actuating said valve, pressure fluid passage means operatively connected to said motor means and leading to the fuel conduit downstream of the metering orifice, said passage means having first and second orifices in series therein, said first orifice being upstream of said second orifice, a second valve responsive to an air pressure which varies with variations in ambient air pressure for controlling said first orifice to cause the pressure in said passage means to act on said motor means to bias said first valve upon an increase in said air pressure in an opening direction, and a third valve responsive to an air temperature which varies with variations in ambient air temperature for controlling said second orifice to cause the pressure in said passage means to act on said motor means to bias said first valve upon an increase in said air temperature in a closing direction.

References Cited in the file of this patent

UNITED STATES PATENTS

| 2,424,304 | Cunningham | July 22, 1947 |
| 2,438,663 | Greenland | Mar. 30, 1948 |
| 2,440,566 | Armstrong | Apr. 27, 1948 |
| 2,503,048 | Ifield | Apr. 4, 1950 |
| 2,609,662 | Vogt et al. | Sept. 9, 1952 |
| 2,644,513 | Mock | July 7, 1953 |

FOREIGN PATENTS

| 934,814 | France | Jan. 19, 1948 |